March 15, 1932.  W. W. MACFARREN ET AL  1,849,501
ROTARY FLYING SHEAR
Filed Sept. 2, 1930  5 Sheets-Sheet 1

INVENTORS
Walter W. Macfarren
Richard A. Macfarren
BY Walter W. Macfarren
ATTORNEY.

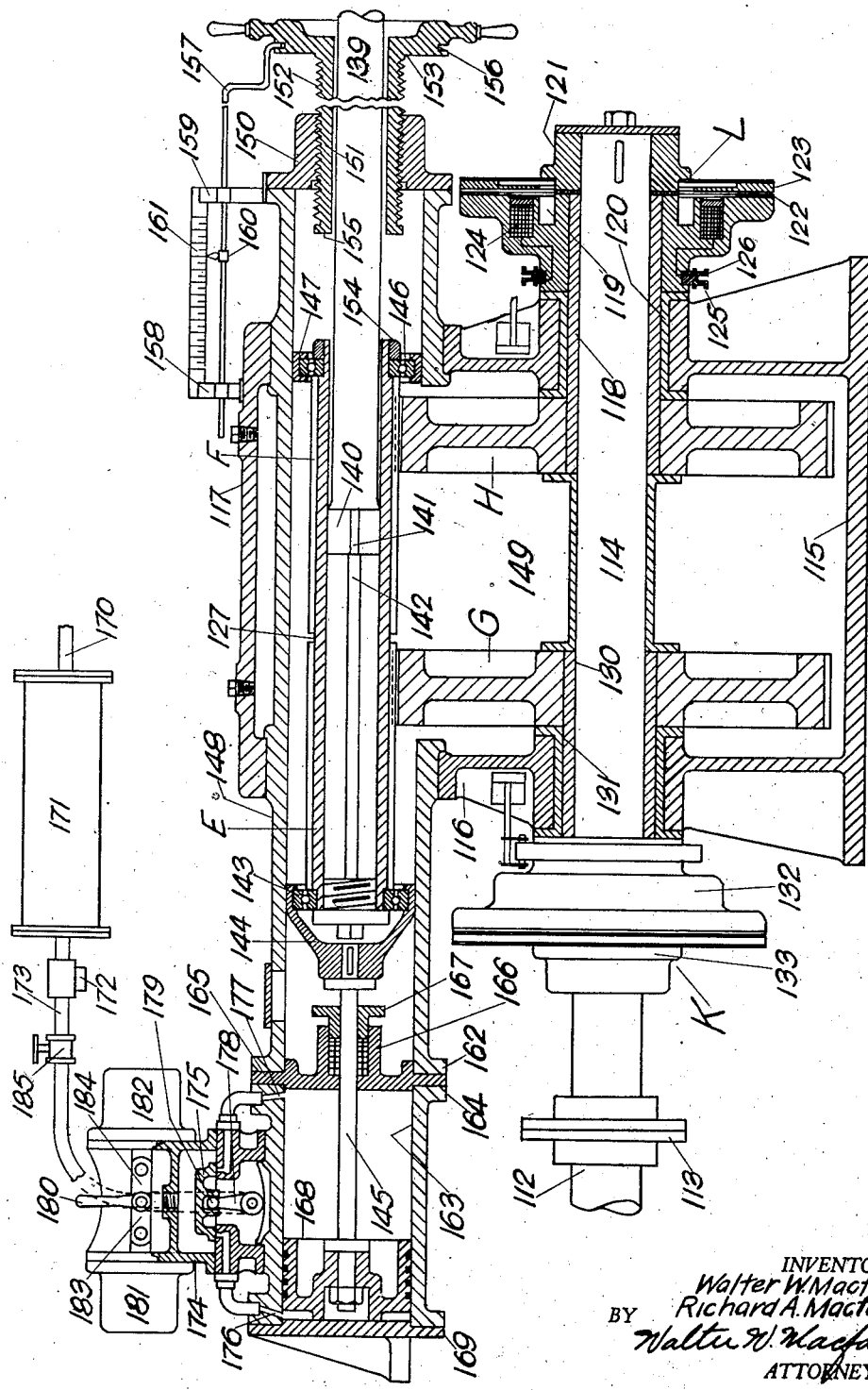

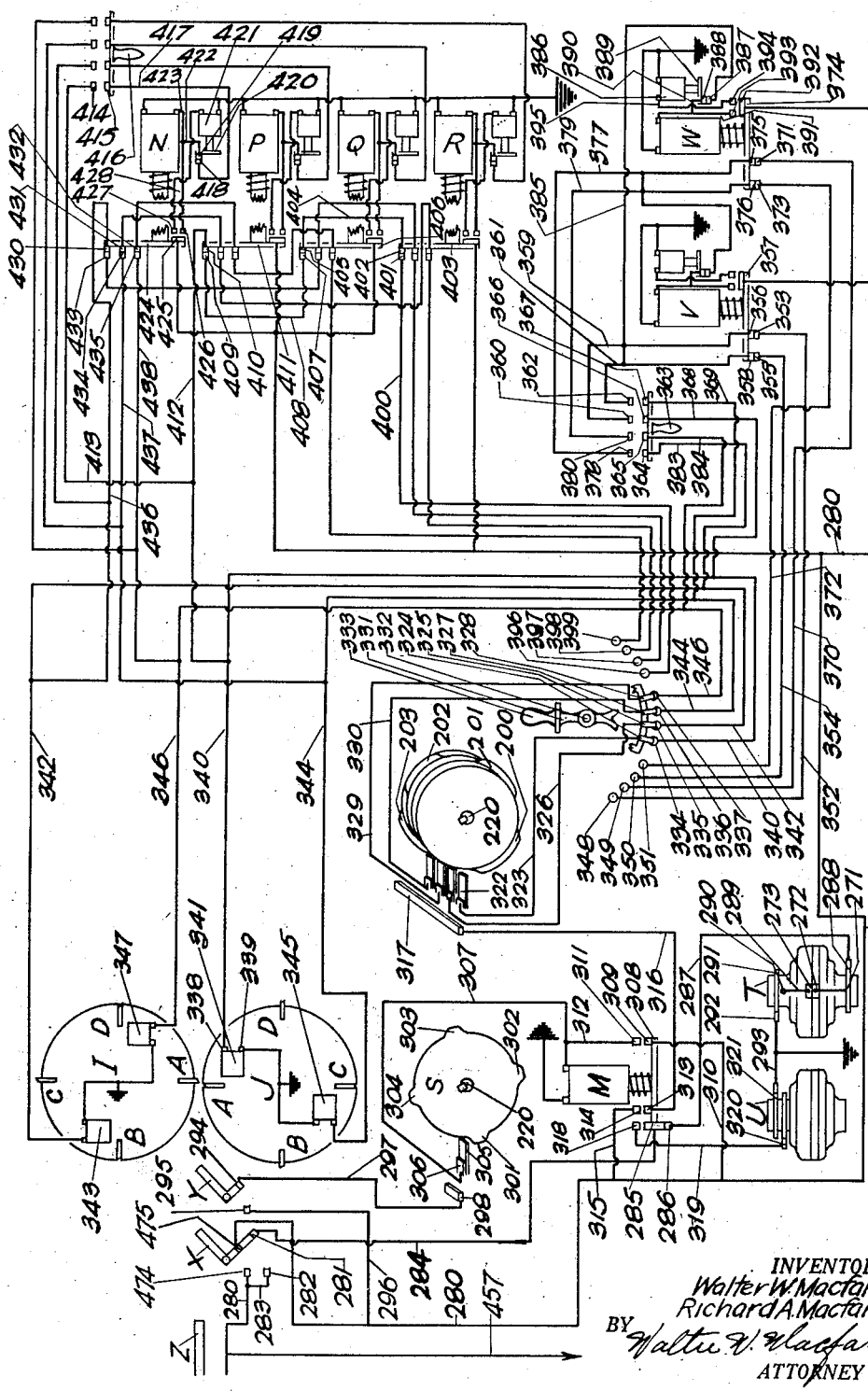

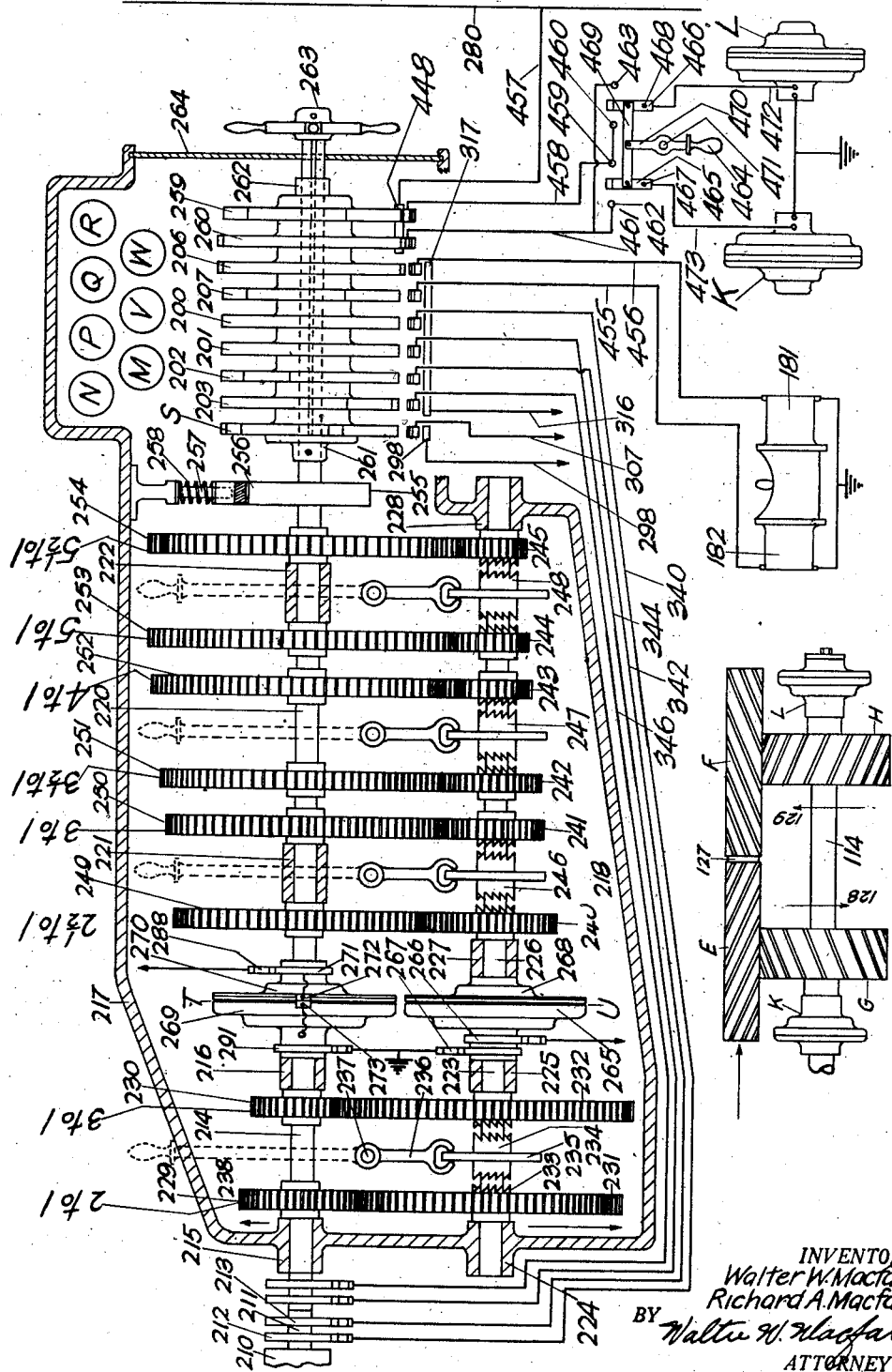

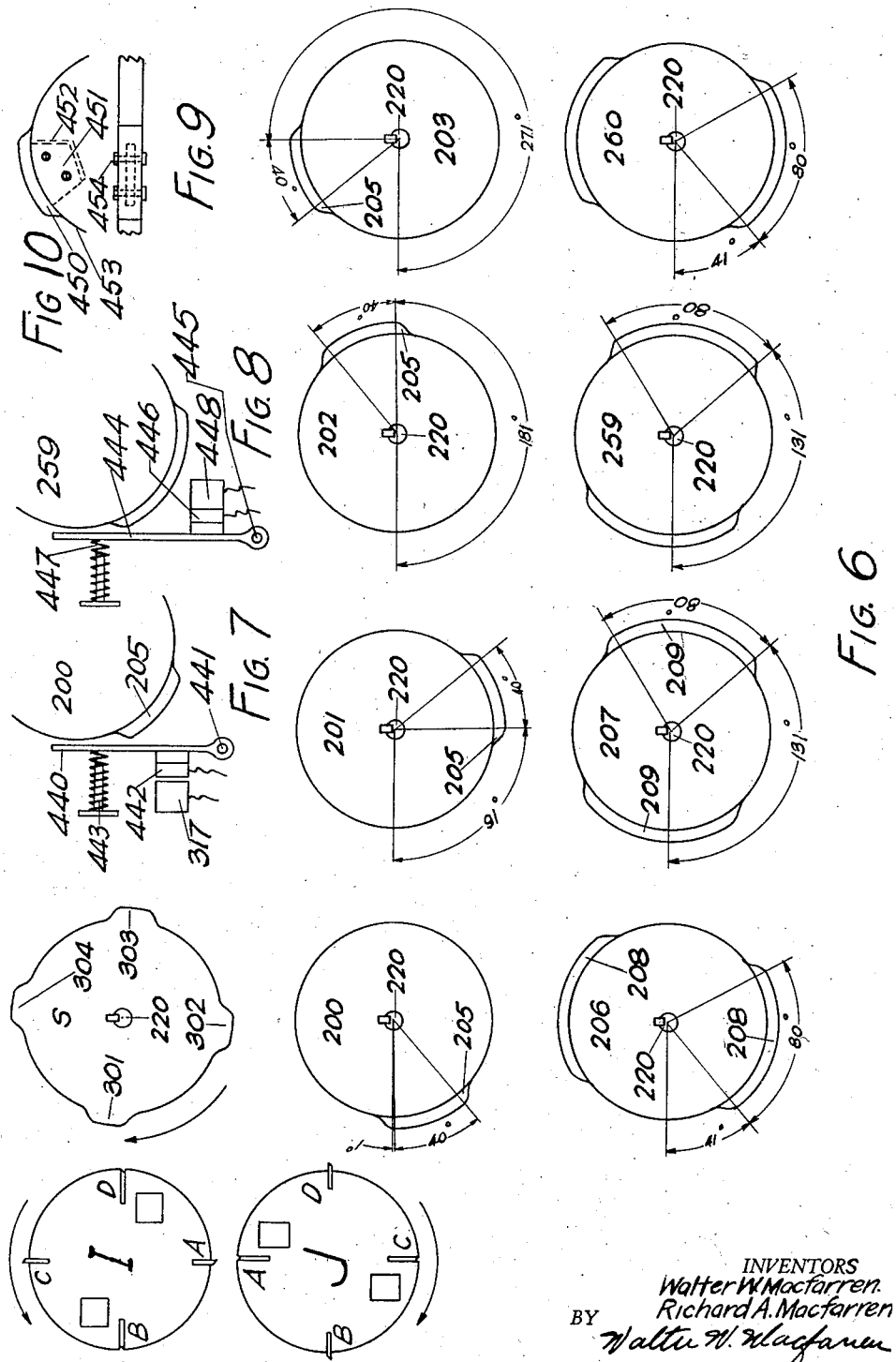

Patented Mar. 15, 1932

1,849,501

UNITED STATES PATENT OFFICE

WALTER W. MACFARREN AND RICHARD A. MACFARREN, OF LOS ANGELES, CALIFORNIA, ASSIGNORS TO WALTER W. MACFARREN, OF LOS ANGELES, CALIFORNIA

ROTARY FLYING SHEAR

Application filed September 2, 1930. Serial No. 479,322.

Our invention relates to driving and controlling means for rotary flying shears of the type shown in a co-pending application filed April 11th, 1929, by W. W. Macfarren and bearing Serial No. 354,414.

The said application discloses a rotary flying shear comprising two knife carrying drums mounted one above the other in rigid bearings, and each drum provided with two rigid and two radially adjustable knives—the drums being of equal diameter and geared together in fixed relation.

Each movable knife co-acts with a fixed knife on the opposite drum, and the bar to be sheared passes between the drums.

The radially adjusted knives are magnetically adjusted to a normal inner position when they do not cut, and to an outer position at which they may cut a metal bar passing between the drums, the speed of this bar being synchronized with the circumferential speed of the knife cutting edges.

As each adjustable knife controls the cutting action of the pair of knives formed by itself and its co-acting rigid mate, it is only necessary to control the adjustable knives radially to obtain the desired spacing of the cuts.

Assuming that the pairs of knives are spaced evenly around the drums two feet apart and that each adjustable knife may be brought into cutting relation at will as the drums rotate, it is evident that cuts may be spaced apart in even multiples of two feet.

The co-pending case above referred to also shows shiftable helical drive gears for the drums by the operation of which the drums (and knives) may be angularly advanced between cuts to cut lengths intermediate of multiples of the knife spacing (two feet).

The objects of the present invention are:

1. To provide means whereby the drums may be angularly advanced a predetermined amount in such a manner that an indefinite number of increments can be added, one between each pair of successive cuts, or otherwise so that any desired increments up to say twelve inches can be added to a multiple of the knife spacing of say eighteen feet, thus making it possible to shear accurate lengths in inch fractions between eighteen and nineteen feet, and similarly for other lengths.

2. To provide means whereby in a similar manner angular decrements up to say twelve inches may be subtracted between cuts from a multiple of the knife spacing of say twenty feet, thus allowing the machine to cut any lengths between nineteen and twenty feet, and similarly for other lengths.

3. To provide a simple and accurate adjusting means to fix the angular increment or decrement.

4. To provide means whereby these angular changes may be reliably accomplished at high speeds.

5. To provide controlling means for the radial adjustment of the different knives, whereby they may be operated in desired sequences.

6. To provide controlling means for the angular advance or retardation of the knives between cuts.

7. To synchronize the various controlling means with each other, and in short, to provide driving and controlling means for a rotary flying shear of the type indicated whereby the machine can be set to cut equal sections from a moving bar of any desired lengths between the maximum and minimum lengths for which the machine is designed.

To illustrate our invention we provide the accompanying drawings in which:

Fig. 3 is an enlarged sectional elevation of the drive gears, main clutches, and the shifting pinion and its operating cylinder and controls.

Fig. 4 is a diagram of the electrical control circuits for the knife magnets.

Fig. 5 is an enlarged plan view of the gear box with the top half or cover removed, showing the change speed gears, contactor cams, etc.

Fig. 6 is a diagram showing the shape and relative setting of the various contactor cams.

Fig. 7 is a diagrammatic elevation of one of the knife cams and the contactor arms operated thereby.

Fig. 8 is a similar view of a clutch cam and its contactor arm.

Fig. 9 is a plan view of a detachable cam tooth.

Fig. 10 is an elevation of the same.

Fig. 11 is a diagrammatic elevation showing the helical drive gears and the main clutches.

There are four pairs of knives of which any pair may be caused to cut independently of the others. These several pairs of knives may be designated by the letters A, B, C, and D.

(It will be shown later that under favorable conditions the same results as to accuracy and lengths of cuts may be obtained with a machine having only a single pair of cutting knives.)

The two halves of the shift pinion may be lettered E, and F, the main gears G, and H, the upper knife carrying drum designated by I, the lower drum by J, and the main magnetic clutches by K and L, respectively.

The main magnetic switch is lettered M, the individual magnetic switches for the knife magnets are designated respectively by N, P, Q, and R.

The selector cam is lettered S, the aligning clutch is designated by T, and the cycle clutch by U.

The letter V designates one of the pair cut-out switches, and the letter W the other pair cut-out switch.

The letter X designates the first "flag" or strip operated switch, and the letter Y a second similar switch.

Z is the moving strip which is to be cut into sections.

Figure 1:
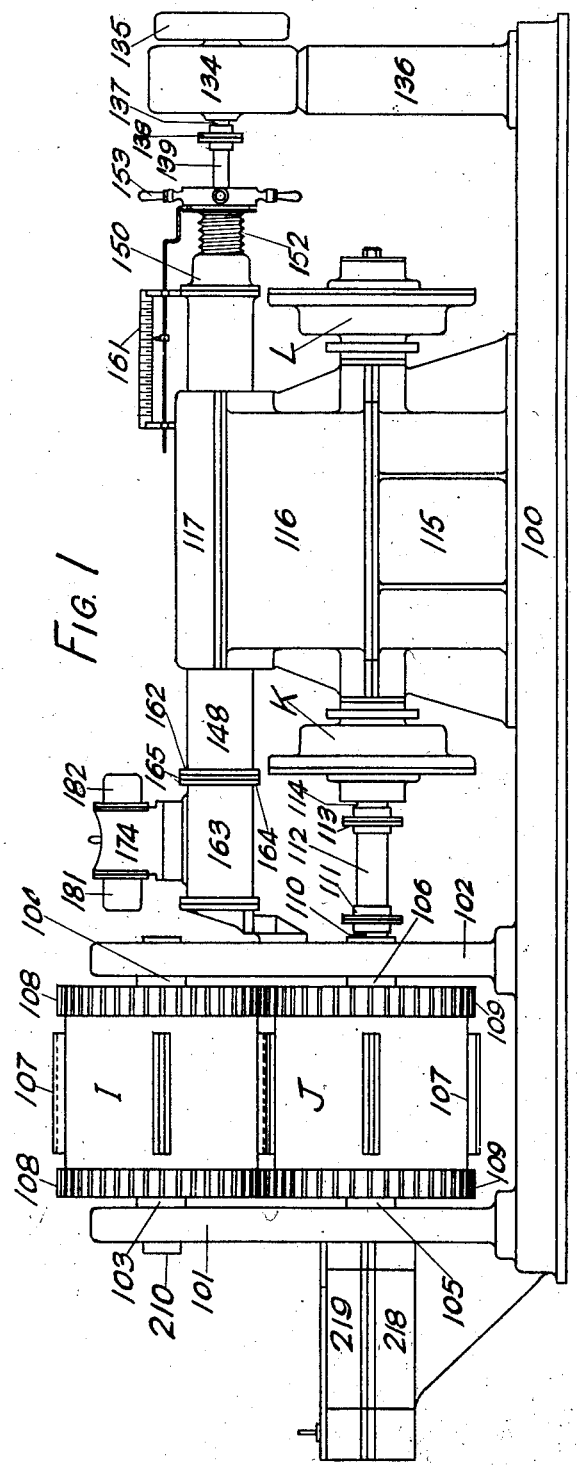
Fig. 1 is a side elevation of a complete machine.
Figure 2:
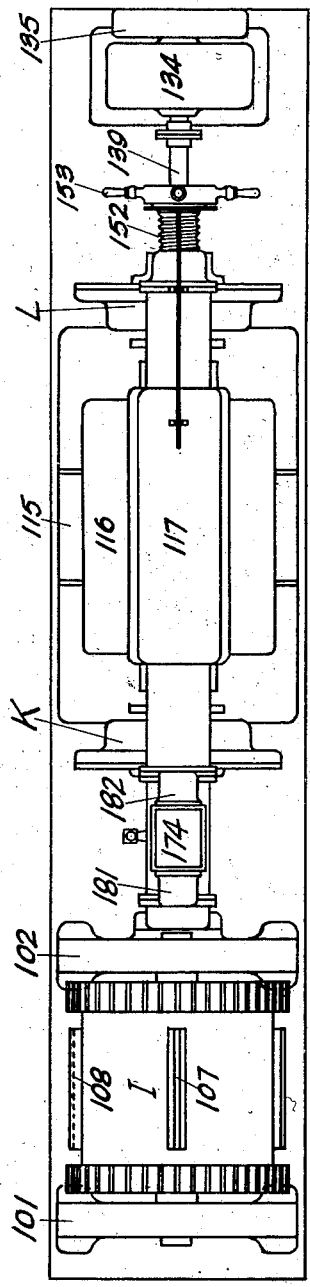
Fig. 2 is a plan view of the same with the gear box omitted.

Referring to Figs. 1 and 2 a sub-base 100 carries the housings 101 and 102 which are provided with suitable bearings 103 and 104 which in turn support the upper drum I. Similar bearings 105 and 106 support the lower drum J. The various shear knives are indicated at 107. The drums I and J are geared together by spur gears 108 and 109.

The lower drum shaft 110 is connected by a coupling 111 to a short shaft 112 which is connected by a second coupling 113 to a drive shaft 114.

The drive shaft 114 is mounted in a three-part gear case or housing having a bottom section 115, a middle section 116, and a top section 117. (See Fig. 3.)

Referring to Figure 3 the gear H is mounted on one end of a quill 118, and the driving member 119 of the magnetic clutch L is mounted on the other end of the quill 118.

The quill 118 loosely surrounds the shaft 114 and a bearing 120 supports the quill 118, the bearing 120 being mounted between the gear case sections 115 and 116.

The driven member 121 of the magnetic clutch L is fixed to the end of the shaft 114. The driving clutch member 119 is provided with a friction disc, 122 which engages a friction face 123 on the driven member 121, these two parts being drawn into contact in the usual manner by the magnet coil 124 which may be energized through the insulated collector rings 125 and 126.

Referring to Figs. 3 and 7 the helical pinion 127 has two sets of opposed helical teeth E and F, which are in effect two connected helical pinions.

The pinion E meshes with and drives the gear G, which through the clutch K transmits power to the shaft 114.

The pinion F meshes with and drives the gear H, which through the clutch L also transmits power to the shaft 114.

When both clutches K and L are engaged, the power transmission is the same as that between an ordinary double helical pinion and its mating double helical gear. This is the condition which obtains when the knives are making their cuts.

Assuming the parts shown in Figs. 3 and 11 to be stationary, it will be seen that when both clutches K and L are engaged, the pinion 127 is held against endwise movement by the helical gear teeth.

If, however, the clutch K is disconnected then the pinion 127 may be moved endwise in either direction, and this endwise movement will impart a rotary movement to the gears G and H.

If the pinion 127 is moved to the right, the gear G will be angularly moved in the direction shown by the arrow 128 due to the indicated slope of the teeth of gears E and G.

At the same time this movement of pinion 127 to the right will move the gear H angularly in the opposite direction as shown by its arrow 129. As the clutch K is disengaged, and the clutch L may be engaged, this movement of pinion 127 will rotate the shaft 114 with the gear H, and cause the gear G to idle on the shaft 114 in the reverse direction.

If under the above conditions the movement of pinion 127 had been to the left instead of to the right, the gears G and H, and the shaft 114 would have been angularly moved in directions opposite to those shown by the arrows.

Again assuming the parts shown in Figs. 3 and 11 to be stationary; if the clutch K is engaged and the clutch L is disengaged, a movement of pinion 127 to the right as before, will produce the same relative angular movements as shown by the arrows, as before, but now since the clutch L is disengaged, the gear H will merely idle, and the shaft 114 will be angularly moved by the gear G in the direction shown by its arrow 128, which is in the opposite direction to which it was moved by the same right hand travel of pinion 127 with clutch L engaged.

It will thus be seen that a right hand movement of pinion 127 will produce either a forward or a reverse angular movement of shaft 114, depending on which of the clutches K or L is engaged.

It will also be clear that a left hand movement of pinion 127 will also produce either a forward or reverse angular movement of shaft 114, depending on which of the clutches K or L is engaged.

It will be thus seen that since either a right or left hand movement of pinion 127 will produce a forward motion of shaft 114, according to which clutch is engaged it is possible to produce a series of intermittent forward angular movement of shaft 114 by a series of alternate right and left hand reciprocatory movements of pinion 127, in conjunction with the alternate engagement and disengagement of the clutches K and L.

It will be evident that in a similar way, by the engagement of the clutches K and L in a reversed sequence a series of intermittent backward angular movements of the shaft 114 may be produced.

These four operating conditions may be illustrated as follows: with clutch K on and clutch L off, a right hand movement of pinion 127 will produce angular motion of shaft 114 as shown by arrow 128; with clutch L on and clutch K off a left hand motion of pinion 127 will produce angular movement of shaft 114 in the direction shown by arrow 128, or the same as before.

With clutch L off and clutch K on, a left hand movement of pinion 127 will produce an angular movement of shaft 114 in the direction shown by arrow 129; and finally with clutch K off and clutch L on, a right hand movement of pinion 127 will produce an angular movement of shaft 114 in the direction shown by arrow 129 as before.

These angular movements of shaft 114 will of course be imparted to the drums I and J through the short shaft 112.

While the previous description has been based on the parts being stationary, this was done for the sake of clearness only.

It can now be seen that the actual rotative speed of the shaft 114 has no relation to the action just described, as the effect of an endwise movement of pinion 127 is either to advance or retard the angular position of the gears G and H an amount determined by the slope or angles of the gear teeth and the length of movement of pinion 127, irrespective of its rotative speed.

Reverting to the description of Fig. 3, the gear G is mounted on one end of a quill 130 which surrounds the shaft 114 and is journaled in bearings 131 supported between the gear case sections 115 and 116. The driving member 132 of clutch K is mounted on the opposite end of the quill 130, and the driven member 133 of clutch K is fixed to the shaft 114.

Thus power from either or both gears G and H can be transmitted to the shaft 114 by proper manipulation of the clutches K and L.

A motor 134, provided with a flywheel 135 is mounted on a stand 136 secured to the sub-base 100.

The motor shaft 137 is coupled by a coupling 138 to the pinion drive shaft 139. The shaft 139 has an enlarged end 140 provided with integral keys 141 which engage long keyways 142 in the bore of the pinion 127, to drive the same. The left end of the pinion 127 is mounted in a ball-bearing 143, which is in turn mounted in a sliding member 144, to which is secured a piston rod 145.

The right end of the pinion 127 is similarly mounted in a ball-bearing 146, which is in turn mounted in a sliding member 147.

The sliding members 144 and 147 are cylindrical and are a loose or working fit in a cylindrical guide 148 which is rigidly secured between the middle gear case section 116 and the upper section 117.

An opening 149 is provided at the lower side of the cylindrical guide 148 through which the gears G and H extend to mesh with the pinion 127. At the right end of the cylindrical guide 148 we provide a flanged nut 150 secured to the guide 148 and concentric therewith. A hollow stop 151 is provided with external threads 152 which engage corresponding threads in the nut 150. The stop 151 is provided with a hand wheel 153, to adjust the same.

The right end 154 of the pinion 127 strikes the left end 155 of the stop 151 to limit the travel of the pinion 127 to the right.

The hand wheel 153 has a groove 156 which engages a rod 157, the same being supported and guided by small bearings 158 and 159, and provided with a pointer 160 which registers with a scale 161 fixed to the bearings 158 and 159.

As will be seen later it is desired to advance or retard the drums I and J for a maximum of one foot measured on the pitch circle of the knives 107 and gears 108 and 109.

To do this it is preferred to make the slope of the helical teeth on gears E, F, G, and H in the proportion of one to two.

If the gears G and H are equal in diameter to the gears 108 and 109, it will then require a stroke of two feet of the pinion 127 to obtain an angular advance or retardation of one foot at the knives.

The scale 161 enables the operator to set the machine for a desired angular increment or decrement before starting to cut, and while this scale would be actually twenty-four inches long, it should be divided into twelve major divisions so that the angular increments at the knives can be read directly in inches.

At its left end, the cylindrical guide 148 is provided with a flange 162 to which is bolted an air cylinder 163, having a flange 164. Between the flanges 162 and 164, there is secured a cylinder head 165 provided with the usual stuffing box 166 and gland 167 for the piston rod 145.

The rod 145 is secured to a piston 168 working in the cylinder 163. The cylinder 163 is provided with the usual rear cylinder head 169.

The cylinder 163 is operated by compressed air supplied through a pipe 170 to an air reservoir 171 and may pass through a reducing valve 172 and a pipe 173 to the valve chest 174.

The chest 174 is provided with a common D valve 175 which controls the supply of air to the cylinder ports 176 and 177.

The valve 175 is operated by a short lever 178 mounted on a shaft 179 which also carries a longer lever 180 to which there is connected a pair of electromagnets 181 and 182 by links 183 and 184 and suitable pins.

The magnets 181 and 182 may be energized alternately to turn on the air to the right and left ends respectively of the cylinder 163. This is done automatically as will be seen later.

In case the air cylinder 163 is not to be operated, the air may be shut off by a stop valve 185, or the lever 180 may be set in a central position as shown.

As previously stated the knives 107 are assumed to be spaced two feet apart on the drums, and each pair of knives A, B, C or D may be brought into cutting relation with the strip Z by energizing the appropriate knife magnets.

With a knife spacing of two feet, it is possible to cut sections from the strip of any length which is a multiple of two feet, but for the sake of brevity the machine herein described will be assumed to make cuts from a minimum of ten feet to a maximum of twenty-four feet. Cuts in even multiples of two feet will be considered first.

Fig. 6 shows diagrammatically the various contactor cams required to operate the knife magnets, the air valve magnets 181 and 182, and the main drive clutches K and L and also the selector cam S.

All the cams in Figure 6 are designed for an eighteen foot cut or for an eighteen foot cut plus an increment or minus a decrement.

Each pair of co-acting knives of which at least one knife must be radially adjustable requires an operating magnet or magnets and a contactor cam to control the same.

There are thus four knife cams, 200, 201, 202, and 203. These cams are duplicates of each other and are all keyed to the cam shaft 220 in the relative angular positions shown in Figure 6.

Each of these cams controls the cutting action of one pair of knives, in conjunction with the revolution of the drums I and J.

The knives always cut at the tangent position, or approximately on the vertical center line of the drums I and J.

The supply of current to the knife magnets is so arranged that the magnet to be energized takes current about ten degrees of revolution after its knife passes the cutting position and the knife cuts the next time it passes the cutting position; and the current is then cut off at the same point it was cut on, unless the same knife is to make successive cuts on successive revolutions which is not considered for the machine herein described.

It will be noted that an eighteen foot cut requires 2¼ revolutions of the drums I and J between cuts or 9 knife pitches of two feet each.

As there are four knife cams each carrying a projection 205 to operate the contactors, and these projections 205 are equally spaced around the circle of revolution at 90 degrees apart, it is necessary in order to keep the current on the knife magnet for an even revolution as above described, that the knife cams be driven in a fixed ratio to the drums I and J, and also that the arc of the cam projections 205 be such that with said gear ratio, the contactor will be held in contact for just one revolution of the drums I and J.

For an eighteen foot cut, the gear ratio between the knife cams and the drums will be 1 to 9 and the arc of the knife cam projections 205 will be 40 degrees.

With this arrangement it will be seen that starting at the instant the current is sent to the knife magnet it will remain on for 40 degrees of cam revolution which is equal due to the gear ratio of 1 to 9, to 9×40 or 360 degrees of drum revolution.

Starting again at the beginning of the contact of one projection 205, the succeeding cam will have the leading end of its projection 205, at an angle of 40 plus 90 or 130 degrees behind the previous cam.

Thus the current will be switched on to the succeeding selected knife magnet 130 degrees of knife cam revolution later, or 3¼ drum revolutions after the beginning of contact for the previous cut. Deducting the one drum revolution used to energize the first drum magnet, there remains 2¼ revolutions between cuts, thus making 18 foot cuts, which cycle can be indefinitely repeated.

If the cuts are to be 18′—3″ instead of 18′—0″ it will then be necessary to advance the drums I and J angularly 3″ on the pitch line of the knives between successive cuts.

This can be done by the operation of the air cylinder 163 as previously described.

To actuate the air valve magnets 181 and 182, we provide a cam 206 for the magnet 181, and a similar cam 207 for the magnet 182. These cams 206 and 207 are each provided with a pair of equal projections 208 and 209 formed 180 degrees apart on the cams.

These projections 208 and 209 have an arc of 80 degrees on the cam, or each projection corresponds to two drum revolutions with a gear ratio of 1 to 9.

The cams 206 and 207 are set in the angular relation to each other and to the knife cams 200, 201, 202 and 203 as shown in Fig. 6.

It will be noted that the pair of knives A is shown in the cutting position, or more accurately stated, at the finish of the cut, and that the knife cam 200 is shown in a position about 1 1/9 degrees, before it makes contact, thus allowing the knife to travel 10 degrees to the energizing position before it could possibly move radially outward.

Referring now to the air magnet cam 206, its position is such that the leading end of its leading projection 208 is one drum revolution or 40 degrees of cam arc behind the leading end of the projection 205 of the cam 200.

Thus when the projection 205 of cam 200 has completed its contact, during which time the first cut will be made the projection 208 of cam 206 will operate to send current to the air magnet 182 and this current will remain on the magnet 182 for two full revolutions of the drums I and J, during which time the piston 168 will move to the right for a distance of six inches, this being regulated by the stop 151 to provide an increment of three inches on an eighteen foot cut, or to make a cut section eighteen feet, and three inches long.

It will be observed that the leading projection 209 on the cam 207 will act on its contactor 90 degrees of cam revolution later than projection 208 of cam 206 acted on its contactor, thus energizing air magnet 181 to reverse the air valve 175 when the drums I and J have made 2¼ revolutions, or in time for the next increment.

It will be noted that it is not strictly necessary to hold the current on the air magnets 181 and 182 for two full revolutions as described, as the stroke of these magnets could be completed in less time.

However, it is desirable to take as much of the interval between cuts to produce the angular increments as possible, owing to the inertia values involved. Also it can be seen that the air valve 175 could be mechanically operated by cams similar to those described without the use of magnets at all, in which case the above described cam angles would also apply.

The above description has been based upon the requirements of an 18′—3″. The part relating to increments will apply to all lengths of cuts. For other lengths of cuts, the various cam angles, gear ratios, and so forth required are grouped in the following table:

| Cuts in feet | Knife pitches total gear ratio | Knife cam angles Deg. | Drum Revs. | Air cam angles Deg. | Gear box gear ratios | Knife sequences | Knives cutting |
|---|---|---|---|---|---|---|---|
| 10 | 5 | 72 | 1¼ | 72 | 2 and 2½ | ABCD | All four. |
| 12 | 6 | 60 | 1½ | 75 | 2 and 3 | {ACAC / BDBD} | Pairs. |
| 14 | 7 | 52 | 1¾ | 78 | 2 and 3½ | ADCB | All four. |
| 16 | 8 | 45 | 2 | 79 | 2 and 4 | {AAAA / DDDD} | One. |
| 18 | 9 | 40 | 2¼ | 80 | 3 and 3 | ABCD | All four. |
| 20 | 10 | 36 | 2½ | 81 | 2 and 5 | {ACAC / BDBD} | Pairs. |
| 22 | 11 | 33 | 3¼ | 82 | 2 and 5½ | ADCB | All four. |
| 24 | 12 | 30 | 3 | 83 | 3 and 4 | {AAAA / DDDD} | One. |

To obtain the various gear ratios required and to drive the various cams, the mechanism shown in Fig. 5 is used.

The end of the upper drum shaft is shown at 210 and the same may be reduced in diameter as shown at 211, and this reduced end may carry a pair of insulated contact rings, 212 and 213, one of each of which is electrically connected to the knife magnets for one of the co-acting pairs of knives controlled from the upper drum I.

The end of the shaft for the lower drum J is located just below the shaft 210 and may be secured to a small shaft 214 which is mounted in suitable bearings 215 and 216 in the gear box 217.

The gear box 217 may be formed of a lower section 218 and an upper section 219.

In line with the shaft 214 there is placed a shaft 220 supported in bearings 221 and 222. Parallel to the shaft 214 there is a third shaft 223 supported in bearings 224 and 225.

In line with the shaft 223 there is a fourth shaft 226 supported in bearings 227 and 228. The shaft 214 carries two spur gears 229 and 230 both keyed to the shaft.

The gear 229 meshes with a spur gear 231 on the shaft 223, and the gear 230 meshes with a second gear 232 also on the shaft 223. Both the gears 231 and 232 are loosely mounted on the shaft 223 and each of these gears is provided with a clutch hub 233. A jaw clutch 234 is loosely keyed to shaft 223 for movement end-wise to engage either of the clutch hubs 233.

The jaw clutch 234 is provided with a shifter ring 235 which is engaged by a forked lever 236 on a vertical shaft 237 which also carries a hand lever 238 for shifting the clutch.

The shaft 226 carries six loosely mounted pinions, 240, 241, 242, 243, 244, and 245. Jaw clutches 246, 247, and 248 are provided as shown.

The pinion 240 meshes with a gear 249 fixed to shaft 220. The pinion 241 meshes with a similar gear 250 fixed to shaft 220. The pinion 242 meshes with a similar gear 251 fixed to shaft 220. The pinion 243 meshes with a similar gear 252 fixed to shaft 220. The pinion 244 meshes with a similar gear 253 fixed to shaft 220. The pinion 245 meshes with a similar gear 254 fixed to shaft 220. The gear ratios of these last six pairs of gears are respectively 2½ to 1—3 to 1—3½ to 1—4 to 1—5 to 1 and 5½ to 1. The gear ratio of gears 231 and 229 is 2 to 1. The gear ratio of gears 232 and 230 is 3 to 1.

It will be seen that by using the appropriate clutches the final gear ratios between shafts 214 and 220 may be made 5 to 1—6 to 1—7 to 1—8 to 1—9 to 1—10 to 1—11 to 1 and 12 to 1 as required for 10—12—14—16—18—20—22 and 24 foot cuts.

Mounted on shaft 220 we provide a brake drum 255 which is engaged by a shoe 256 supported by a guide 257 and pressed by a spring 258.

The various contactor cams 200—201—202—203—206—207—259 and 260, and the selector cam S are all mounted adjacent to each other and keyed to the shaft 220 between the collars 261 and 262.

A hand wheel 263 is secured to the outer end of shaft 220 and outside of the end plate 264 for the purpose of rotating the cams by hand.

A magnetic clutch U which we call the "cycle clutch" connects shafts 223 and 226. The driving member 265 of the clutch U is mounted on shaft 223 and provided with collector rings 266 and 267, the former supplying the current and the latter being grounded. The driven member 268 of clutch U is mounted on shaft 226.

When clutch U is engaged the various contactor cams are rotating at the proper gear ratio to produce the desired lengths of sections cut. A similar clutch T which we call "the alignment clutch" connects the shaft 214 and 220, the driving member 269 of the clutch T being on shaft 214 and the driven member 270 on shaft 220.

For clutch T the current supply enters at a collector ring 271 mounted on the driven member 270, and is led to an insulated contact block 272 located at the circumference of the driven member 270.

When the members 269 and 270 are in a certain angular relation, the block 272 contacts with a similar insulated block 273 mounted at the circumference of the driving member 269 so that current may flow from one to the other to energize the clutch T.

The purpose of the clutch T is to align the various contactor cams with the drums and knives in the relation shown in Fig. 6.

This is necessary as will be explained later more fully in connection with the selector cam S because the knife cams 200, 201, 202 and 203 rotate at drum speed when driven by clutch T and during that time it is desired to have the knife cams in the angular relation to the knives shown in Fig. 6.

As the driving member 269 of clutch T always picks up the driven member 270 at the same point by means of contact blocks 272 and 273, the cam 200 will always have the angular relation to knives A as shown in Fig. 6 and similarly cam 201 to knives B, cam 202 to knives C and cam 203 to knives D. It is clear then that any knife may start to cut if current is permitted to pass into the knife cam contact bar 317 of Fig. 4. It will be understood of course that clutch U is disengaged when clutch T is engaged.

Referring to the table of cuts, etc., previously set forth, it will be seen that there are three types of action required by the knives A, B, C, and D, as follows:

1. Where a single pair of knives makes successive cuts.
2. Where two pairs of knives make alternate cuts.
3. Where all four pairs of knives cut in a continuous sequence.

It will be remembered that the above, and the following description relate specifically to a machine with four pairs of knives, and would probably be different for some other number and arrangement of knives.

It will be seen from the table on page 14 that cuts of ten feet, fourteen feet, eighteen feet, and twenty-two feet, are made with the four pairs of knives acting in certain sequences; that twelve and twenty foot cuts are each made with two pairs of knives (either A and C or B and D), and cuts of sixteen and twenty-four feet are made with a single pair of knives either A, B, C, or D.

The description up to this point has been of means to make eighteen-foot cuts, and we will now complete this description by including the electrical circuits in use for this length of cut.

In order to set this forth clearly we will describe the operation of the machine to make cuts of eighteen feet, three inches.

The strip Z, moving to the right in Fig. 4 strikes the "flag" X and carries the movable contactor 281 into contact with the stationary contactor 282, which is connected with the main current supply line 280 by the wire 283, thus causing current to flow through the wire 284 to the end contactor 285 of the magnetic switch M which is in contact with the stationary contact 286, which causes current to flow through the wire 287 to the brush 288 (see also Fig. 5) which bears against the collector ring 271 which supplies current to the contact block 272 from which the current passes to the contact block 273 and thence through a short wire 289 to a contact 290 which may be at one end of the magnet coil for the magnetic clutch T.

The other end of the coil may be connected to the collector ring 291 which may be grounded through a brush 292 and a wire 293.

At the same time the flag X closes the main line 280 through contacts 474 and 475. After the passage of each bar or strip through the shear these contacts must be broken to permit automatic switches M, N, T, Q, R, V and W to resume their normal inactive positions as shown. Flag X may be automatically reset by a spring or manually reset by a connected lever (not shown).

The clutch T is thus energized when the blocks 272 and 273 are in line to make contact as previously described, thus locking the various contactor cams to the drum shaft extension 214 in the angular relation shown in Fig. 6.

The flag X can be located at any convenient distance in advance of the drums I and J, say about twenty feet.

A second flag Y is located at a point close to seven feet from the vertical center lines through drums I and J.

When the advancing Z strikes flag Y the movable contactor 294 is moved into contact with the stationary contactor 295 thus allowing current to flow from the main line 280 through wires 296 and 297 to the stationary contact bar 298.

The selector S, mounted on the shaft 220, is provided with four projections 301, 302, 303 and 304.

When the projection 301 strikes the resilient arm 305 the movable contactor 306 is forced against the contact bar 298, allowing current to flow through wire 307 which supplies current to the magnet coil of magnetic switch M, thus energizing the same and raising the cross-bar 308.

The bar 308 carries a contactor 309 which is supplied with current by a wire 310 connected to main line 280. The contactor 309 rises to meet a stationary contact 311 which is connected by a short wire 312 to the wire 307, thus maintaining the flow of current through the magnet coil for switch M when the projection 301 has released the arm 305.

At the same time the contactor 313 is carried into contact with the stationary contact 314 which is supplied from the line 280 by a wire 315, thus allowing current to flow through wire 316 to contact bar 317 which supplies the knife magnet circuits, and making the contact bar 317 live and in readiness to supply current upon demand.

As the cross bar 308 is raised, it also breaks contact between contactor 285 and contact 286, and makes contact with contact 318 which supplies current through a wire 319 and a brush 320 to the collector ring 321 on the driving member 265 of the cycle clutch U.

The energization of magnet switch M thus cuts off current from the alignment clutch T and supplies current to the cycle clutch U, thus starting a cycle with the succeeding pair of knives, or in other words, the next movable knife of a pair to pass the cutting position will have its knife magnets energized at a point about 10 degrees of angular movement beyond the cutting position, and will thus be ready to cut when the said pair of knives again rotate past the cutting point, or in about one revolution of the drums I and J.

In this discussion, the co-acting pairs of knives may be designated by the letters A, B, C and D, and each cycle may be assumed to be started for simplicity by knives A.

This does not mean that each cycle is actually started by the same identical pair of knives, as any pair of knives may start a cycle, but means only for convenience in description, that the starting pair of knives may be designated by the letter A and the successively rotating pairs by B, C and D.

Just previous to the energization of magnetic switch M, the selector S and all the contactor cams have been rotating at drum speed, and registered with the knives in the angular relation shown in Fig. 6.

The action of the switch M cuts out clutch T and cuts in clutch U, thus bringing the speed of the various cams on shaft 220 to the predetermined geared speed required to cut the length desired.

It may be noted here that the various jaw clutches 234, 246, 247 and 248 are set to give the proper speed for the desired lengths of cut in advance of the actual cutting operation.

Having current supplied to contact bar 317, the contactor cam 200 may operate the arm 322 (in a similar manner to that described for arm 305) to cause current to flow through wire 323 to contactor 324, and similarly cam 201 may supply current to contactor 325 through a wire 326, and in the same way cams 202 and 203 may cause current to flow to contactors 327 and 328 through wires 329 and 330 respectively.

The contacts 324, 325, 327 and 328 are all mounted on a switch lever 331 pivoted on a pin 332 and which may be manually actuated by a handle 333.

As shown in Fig. 4, the contact 324 engages a stationary contact 334, the contact 325 engages a similar contact 335, the contact 327 engages a contact 336, and the contact 328 engages a contact 337.

In this position of the switch lever 331 circuits are established to all the knife magnets for cutting lengths in which the knives act in a sequence. When the switch lever 331 is thrown to carry the contacts 324, 325, 327 and 328 to the left, circuits are established controlling only a pair of knives, and when the switch lever 331 is thrown to the right circuits are established limiting the cutting action to a single knife (i. e. adjustable knife).

The contact 334 is connected with the contacts 338 on the knife magnet 341 by a wire 340. The contact 339 of the magnet 341 may be grounded.

In a similar manner the wire 342 supplies current to the magnet 343, the wire 344 supplies to the magnet 345, and the wire 346 supplies current to the magnet 347.

As so far described the current supply for the knife magnets 341, 343, 345 and 347 is direct through the contacts on switch arm 331 and is timed by the knife cams 200, 201, 202 and 203.

In other words, this is the direct circuit to the knife magnets when all the knives are cutting in sequence. The operator will know in advance how many knives are to cut and will set the switch lever 331 to suit.

When only a pair of knives is to cut the lever 331 is moved with its lower end to the left to engage the four contacts 348, 349, 350 and 351.

From contact 348 a wire 352 leads to a stationary contact 353, and from contact 350 a wire 354 leads to a similar contact 355.

Contact 353 contacts with a movable contactor 356 on the movable switch arm 357, and which is actuated by the magnet of the magnetic switch V.

Contact 355 contacts with a similar movable contact 358 also on switch arm 357 from contact 356 a wire 359 leads to a contact 360, and from contact 358 a wire 361 leads to a contact 362.

A single throw four contact switch 363 carries the contacts 364, 365, 366 and 367. The switch 363 is shown open, which is the correct position when the knives are cutting in sequence, but when only a single pair of knives as A and C or B and D are cutting the switch 363 will be closed.

Then the contact 360 engages the contact 366 and contact 362 engages contact 367, thus supplying current from contact 366 through a wire 368 to a wire 340 leading to knife magnet 341, and also supplying current from contact 367 through a wire 369 to a wire 344 leading to knife magnet 345.

The circuits just described are thus put in readiness to transmit current to the actuated magnets 341 and 345 controlling the co-acting pair of knives A and the co-acting pair of knives C respectively.

At the same time the circuits controlling knife pairs B and D through magnets 343 and 347 are held open to prevent the radial adjustment of these pairs as will now be described.

From contact 349 a wire 370 leads to a contact 371, and from contact 351 a wire 372 leads to contact 373.

The magnetic switch W actuates a switch bar 374 which carries a contact 375 which engages a stationary contact 371 and a contact 376 which engages a stationary contact 373.

From contact 375 a wire 377 leads to a contact 378, and from contact 376 a wire 379 leads to a contact 380.

The contacts 378 and 380 are engaged respectively by movable contacts 364 and 365 on the switch 363.

From contact 364 a wire 383 leads to the wire 342 connected to knife magnets 343, and from contact 365 a wire 384 leads to the wire 346 supplying current to knife magnet 347.

If now the pairs of knives A and C are to cut, current will flow through one of the contacts 353 or 355, the switch V, (also switch W) being normally in the position shown. Which of the contacts 353 or 355 is energized first depends on the action of the knife cams 200 or 202. Either of the wires 359 or 361 will be made live and either wire will supply current to the cross wire 385.

The wire 385 is connected to a stationary contact 387 which as shown in Fig. 4 is in contact with a movable contactor 388 mounted on the switch bar 389 of the switch 386. A small wire 390 connects the contactor 388 with a wire 391 leading to one terminal of magnetic switch W, the other terminal of the same being grounded.

The switch bar 374 of switch W carries a double contactor 392 which makes contact with the stationary contacts 393 and 394, and is supplied with current from the main line 280.

Contact 393 supplies wire 391 to energize switch W for a holdon circuit. Contact 394 supplies current through wire 395 to magnetic switch 386 which thus opens contacts 387 and 388 to prevent current flowing back from main line 280 through wire 391, wire 390, wire 385, wire 340, and wire 344 to magnets 341 and 345, which would if it occurred hold on these knife magnets, and take away the control of the same by the knife cams.

The contactors 375 and 376 on switch arm 374 are also carried away from contacts 371 and 373 respectively, thus breaking the circuits to the upper knife magnets 343 and 347, and by reason of this action confining the cutting operation to the knives A and C.

Thus for knives A and C switch V allows current to flow to the knife magnets 341 and 345 and at the same time switch W opens the circuits to the knife magnets 343 and 347 for knives B and D.

If however the current had passed through either wire 377 or 379, then switch W would have allowed current to flow to knife magnets 343 and 347, thus operating knives B or D, and at the same time switch V would have opened the circuits to knife magnets 341 and 345, thus cutting them out of action.

The following description applies to the circuits controlling the knife magnets 341, 343, 345, and 347, when only a single knife is cutting.

This is accomplished by the magnetic switches N, P, Q and R, either of which when energized will cut out the other three.

When it is desired to cut with one knife only, the switch handle 333 is thrown to the left (see Fig. 4) which brings contactors 324, 325, 327 and 328 respectively in contact with the stationary contacts 396, 397, 398 and 399

If for instance cam 200 causes arm 322 to contact with bar 317, current will flow through wire 323, contactor 324, contact 396, and wire 400 to stationary contact 401, movable contact 402 on switch bar 403 of magnetic switch R.

Wire 404 connects contact 402 with a movable contactor 405 on switch arm 406 of switch Q. The contactor 405 contacts with a stationary contact 407 which is connected by a wire 408 with a stationary contact 409.

A movable contactor 410 on switch arm 411 of switch P contacts with contact 409. From contactor 410 a wire 412 leads to the wire 340 and thence to magnet 341 controlling the operation of knife A.

From wire 412 a connecting wire 413 leads to a stationary contact 414 which may be engaged by a movable contact 415 on the manually operated four contact switch 416.

A wire 417 leads from contact 415 to a stationary contact 418 which is normally engaged by a movable contactor 419 on the switch arm 420 of the magnetic switch 421.

From contact 419 a short wire 422 leads to a wire 423 which connects to one terminal of the magnet coil for switch N, the other terminal of which may be grounded.

When magnetic switch N is energized its switch arm 424 is raised, carrying the double contactor 425 into contact with the stationary contact 426 which supplies current to wire 423, thus holding on magnetic switch N after the cam projection on cam 200 has released arm 322.

The contactor 425 also contacts with a stationary contact 427 which is connected by a wire 428 with the magnetic switch 421 to energize the same.

When magnetic switch 421 is energized it breaks the circuit to contacts 418 and 419, wires 422, 417, 413, 412, and 340, to prevent current from the holdon circuit of magnetic switch N from reaching the knife magnet 341 and keeping the same permanently energized, thus taking control away from the knife cam 200.

The switch bar 424 of magnetic switch N also carries three movable contactors, 430, 431, and 432, which normally engage three stationary contacts 433, 434, and 435 respectively.

From contact 430 a wire 436 leads to knife magnet 343 through wire 342. From contact 434 a wire 437 leads to knife magnet 345 through the wire 344. From contact 435 a wire 438 leads to knife magnet 347 through the wire 346.

Thus the three knife magnets 343, 345, and 347, which are not to be used, are cut out, and knife magnet 341 is the only one which may operate.

In a similar manner the supply of current by the action of any one of the knife cams 200, 201, 202 and 203 to their respective knife magnets 341, 343, 345 and 347 will cause one of the magnetic switches N, P, Q or R to cut off the supply of current to the other three knife magnets not originally energized, thus allowing the single knife selected to cut along.

In Fig. 7 we show a portion of cam 200 (or 201, 202, 203 206, 207) with a projection 205. The function of the projection 205 is to actuate a lever 440, which is pivoted on a pin 441, and carries as insulated contactor 442 adapted to engage a stationary bar 317 to periodically supply currents to one of the various circuits herein described.

The spring 443 holds the contact 442 normally away from bar 317.

In Fig. 8 a similar arrangement is employed having a lever 444, pivot pin 445, movable contact 446, spring 447, and bar 448. In this case, the circuit is normally closed and is periodically opened by the action of one of the cams 259 or 260.

Figs. 9 and 10 we show a detachable projection 450 provided with a tongue 451 which extends into a slot 452, formed in the cam disc 453 and secured by small bolts 454. This construction may be used for any or all cams 200, 201, 202, 203, 206, 207, 259 and 260 and in case the cam projections are varied for the several lengths cut, the same may be detached and interchanged with others, this being more convenient than a change of the whole cam.

In Fig. 5 the cam 207 closes a circuit from bar 317 to wire 455 by means of a contact lever similar to 440. This supplies current to the coil of air magnet 182, the other end of the coil being grounded.

The cam 206 in a similar manner closes a circuit from bar 317 through a wire 456 to the air magnet 181. The cam 259 opens a circuit normally closed by an arrangement similar to that shown in Fig. 8 between the bar 448 which is supplied with current from the main line 280 by a wire 457, and a wire 458 leading to the two contacts 459 and 460.

The cam 260 opens a similar circuit by a similar means from bar 448 to a wire 461 connected to contacts 462 and 463.

Referring to the previous description of Fig. 3 for obtaining plus and minus increments of the cuts by manipulation of the clutches K and L by the cams 259 and 260, the double throw switch 464 is used to direct the flow of current to either clutch K or L by either of the controlling cams 259 or 260.

The switch 464 comprises two vertical blades 465 and 466 pivoted to a suitable support (not shown) by pins 467 and 468 respectively and connected by a link 469 which is operatively connected to the switch lever 470, the same being pivoted on a pin 471.

As shown the current is cut off both clutches K and L. When link 469 is moved to the left current controlled by cam 259 flows to clutch L through wires 458 and 472 and current controlled by cam 260 flows to clutch K through wires 461 and 473.

When link 469 is thrown to the right current controlled by cam 259 flows to clutch K through wires 458 and 473, and current controlled by cam 260 flows to clutch L to wires 461 and 472. The minus side of the circuits to both clutches K and L may be grounded.

The various contactor cams are shown with detachable projections in Figs. 9 and 10. By reference to the table given earlier in the specification it will be seen that a different arc is required for the cam projections for each length of section cut, if the maximum amount of time is allowed for the action of the knife magnets and other parts.

It will also be seen however that for low and medium strip speeds, this requirement can be ignored, and the same cam projections can be used for all lengths of sections cut, or a combination of these methods can be used, each cam projection being used for several lengths of sections cut.

Before starting to cut, the machine must be set for the desired cut. The operator will refer to a table similar to that given earlier in the specification and will set the gear box levers to give the required gear ratio. He will also set the manually operated switches 333, 363, 416, and 464 to suit.

If the cuts to be made are in even multiples of the knife pitch (two feet) the shift cylinder 163 will not be used and the current may be cut off the air magnets 181 and 182 or the projections may be removed from the air and clutch cams. If increments or decrements are to be added the amount of the same will be determined by the setting of the adjusting screw 151.

It will be noted that for convenience the driving means for our improved shear has been shown as an electric motor which obviously must be synchronized in speed with the mill or other mechanism impelling the strip. For accurate cutting if such a motor cannot be synchronized closely enough with the mill, other means of driving the shear must be used as pointed out in a co-pending application filed by W. W. Macfarren and bearing the Serial Number 347,902.

The maximum speed of the strip at which the shear can be successfully operated will depend on several conditions;

1. If the material to be cut is thick, the shock on the machine will be great and the cutting speed would be less than that with thin material. The same applies to very tough material.

2. The speed of the strip will always be limited by the time necessary to move the knives into and out of cutting position which must be done in less than a full revolution of the drums. If extreme high speed is desired it will be necessary to make the drums correspondingly larger in diameter, which will usually involve the use of a greater number of knives, and require a more expensive machine.

3. When making angular increments or decrements between cuts the time required for moving the shifting pinion will affect the speed limit. This operation will require more time than the radial shift of the knives, because the masses to be accelerated and decelerated are greater.

When making short cuts, say equal to one drum revolution (eight feet) or thereabouts, this time element may be the limiting factor. When making longer cuts, say of two or more drum revolutions there will probably be ample time even at high speeds.

4. The extent of the increment or decrement which fixes the stroke of the shifting pinion may also be a limiting factor. Obviously a short stroke or small increment may be made in less time than a longer one.

5. When extreme high speed of the strip is demanded it can probably be obtained only with comparatively thin material, with comparatively long sections cut, with comparatively large diameter of knife drums, and with comparatively small angular increments. In some cases it may be necessary to cut sections of double or triple the desired lengths and reshear the same subsequently on ordinary shears.

In the above description for the sake of clearness the knife pitch has been assumed as two feet and the number of pairs of knives as four. Obviously any other convenient knife pitch may be used, and any other convenient number of knives.

It is clearly of advantage to use as few pairs of knives as possible on account of the cost of the knives themselves and their operating auxiliaries. For any given machine, the knife pitch will depend on whether only lengths are to be cut which are multiples of the knife spacing, or whether lengths are to be cut intermediate of the multiples of knife spacing.

In the latter case it will probably be necessary to have fairly close knife spacing if the strip speed is high to avoid large increments; however, if the strip speed is low the knife pitch may be greater as in this case more time is available for the shifting pinion to make a larger angular advance of the drum.

For a high speed machine to shear light material the knife pitch might be as little as six inches.

It will be noted that the knives are normally held in an inner (radially) or inoperative position unless their knife magnets are energized to bring them into cutting position. Therefore, if the current supply to the knife magnets should fail, no cuts could be made. If at this time the shear was operating on long strips, say five hundred feet or more in length, and no other provision was made for taking care of this long strip upon failure of the shears to cut, a disastrous cobble would result.

The above contingency can be provided for by placing a constant running pin reel or coiler back of the shear at a suitable distance, say fifty to one hundred feet which would automatically engage the front end of any strip not being cut up by the shear and coil it.

The contactor cams for controlling the various cutting sequences as above shown and described are provided with detachable projections for which others may be substituted to suit different lengths of cuts. It is obvious that these cams could be provided with integral projections and a different set of cams be used for each length cut. Ordinarily this would be inconvenient but it might be advisable when the shear was used for cutting a few standard lengths only.

The foregoing description has been based upon a shear having four pairs of co-acting knives of which any pair may be made to cut at will. It can now be seen that the same lengths could be cut and with the same degree of accuracy with a shear having only a single pair of knives provided that the traveling speed of the strip was not too high.

Such a machine is illustrated in a co-pending application filed by W. W. Macfarren and bearing the Serial Number 347,902 without however, showing the improved drive for obtaining increments between the knife pitches as described and claimed herein.

By combining a machine having two drums and each drum having a single knife, one at least of these knives being radially adjustable, with the drive shown herein comprising the double helical sliding pinion and two helical gears of opposite hand, with their operating clutches, air cylinder, etc. any length between ten feet and twenty-four feet could be cut the same as with the machine herein described.

Such a machine could have a knife pitch circle of say four feet circumference, a corresponding drum diameter of about 15¼ inches, and a pinion stroke of two feet, with helical gear teeth of a forty-five degree helix angle. A two-foot stroke with forty-five degree teeth would give a two foot increment or decrement to the knife, which being applied plus or minus to multiples of the four foot knife pitch would enable the machine to cut any lengths between ten and twenty-four feet as before, at however a lower strip speed.

Having thus described in detail the construction of our improved driving and controlling means for rotary flying shears and indicated its method of operation, we claim as our invention all of the patentable subject matter within the scope of the following claims:

1. In a rotary flying shear comprising a pair of parallel rotary members mounted in rigid bearings and geared together, one of said rotary members carrying a shear knife, and the other of the said rotary members carrying a co-acting shear knife which is radially adjustable, means for driving the rotary members at a uniform speed, means for adjusting the said adjustable shear knife in a radial direction, to cut or not to cut, and means for angularly advancing the rotary knife carrying members a predetermined distance between the successive cuts in succession an indefinite number of times.

2. In a rotary flying shear comprising a pair of parallel rotary members mounted in rigid bearings and geared together, one of said rotary members carrying a shear knife, and the other of the said rotary members carrying a coacting shear knife which is radially adjustable, means for driving the rotary members at a uniform speed, means for adjusting the said adjustable shear knife in a radial direction, to cut or not to cut, and means for angularly retarding the rotary knife carrying members a predetermined distance between the successive cuts in succession an indefinite number of times.

3. In a rotary flying shear comprising a pair of parallel rotary members mounted in rigid bearings and geared together, one of said rotary members carrying a shear knife, and the other of the said rotary members carrying a coacting shear knife which is radially adjustable, means for driving the rotary members at a uniform speed, means for adjusting the said adjustable shear knife in a radial direction, to cut or not to cut, a power operated reciprocating member, means for adjusting the stroke of the said reciprocating member, and means for converting alternate strokes of the said reciprocating member in two opposite directions into successive angular advances of the knife carrying members in the same direction.

4. In a rotary flying shear comprising a pair of parallel rotary members mounted in rigid bearings and geared together, one of said rotary members carrying a shear knife, and the other of the said rotary members carrying a co-acting shear knife which is radially adjustable, means for driving the rotary members at a uniform speed, means for adjusting the said adjustable shear knife in a radial direction, to cut or not to cut, means for angularly advancing the rotary knife carrying members in succession indefinitely, means for accurately adjusting the amount of such advance, and means for timing the said advance to occur between the cuts made by the knives.

5. In a rotary flying shear comprising a pair of parallel rotary members mounted in rigid bearings and geared together, one of said rotary members carrying a shear knife, and the other of the said rotary members carrying a co-acting shear knife which is radially adjustable, means for driving the rotary members at a uniform speed, means for adjusting the said adjustable shear knife in a radial direction, to cut or not to cut, selective means for angularly advancing or retarding the knife carrying members in succession indefinitely, means for accurately adjusting the amount of the said angular changes, and means for timing the said angular changes to occur between the cuts made by the knives.

6. In a rotary flying shear comprising a pair of parallel rotary drums mounted in rigid bearings and geared together, each of said drums carrying a plurality of shear knives, the knives on one drum co-acting respectively with the knives on the other drum and at least half of all the knives being radially adjustable to cut or not to cut, means for adjusting the various adjustable knives to cut in desired sequences, and means operatable at will for angularly advancing the drums in addition to their normal movement a set amount between each of an indefinite number of cuts.

7. In a rotary flying shear comprising a pair of parallel rotary members mounted in rigid bearings and geared together, one of said rotary members carrying a shear knife, and the other of the said rotary members carrying a co-acting shear knife which is radially adjustable, means for driving the rotary members at a uniform speed, means for adjusting the said adjustable shear knife in a radial direction, to cut or not to cut, means for controlling the timing of the cuts with relation to the moving bar passing between the knife carrying members, and means operatable between cuts for varying the angular position of the knives with respect to the length of the moving bar being cut, whereby any length of sections may be cut within the limits of the design.

8. In a rotary flying shear comprising a pair of parallel rotary drums mounted in rigid bearings and geared together, each of the said drums carrying a plurality of shear knives, the knives on one drum co-acting respectively with the knives on the other drum, and at least half of all the knives being radially adjustable to cut or not to cut, a magnet on one of the drums for controlling each of the adjustable knives, a cam for controlling the current supply to each of the knife magnets, and changeable gearing between one of the drums and the said knife cams to drive the latter in proper ratio for the desired length of cut.

9. In a rotary flying shear comprising a pair of parallel rotary drums mounted in rigid bearings and geared together, each of said drums carrying a plurality of shear knives, the knives on one drum co-acting respectively with the knives on the other drums, and at least half of all the knives being radially adjustable to cut or not to cut, a magnet for operating each adjustable knife, means for angularly advancing the drums between cuts including an air cylinder and two magnetic drive clutches, two magnets for controlling the air supply to the said cylinder, contactor cams controlling the current supply to the knife magnets, the magnetic drive clutches, and the air supply magnets, and a gear box controlling the relative speed of the drums and the various contactor cams to produce the desired lengths of cuts.

10. A rotary flying shear including, the combination of a wide face double helical pinion, in mesh with two narrow face single helical gears both loosely mounted on a driven shaft and each connected thereto by a clutch, with means for driving the pinion, means for shifting it axially, and means for engaging and disengaging the clutches, whereby the pinion will drive the driven shaft through the gears in either direction without axial motion and with both clutches engaged; the pinion will drive the shaft through either clutch and may then be shifted in either direction axially to advance or retard the shaft angularly; and finally by alternate to and fro axial movements of the pinion in conjunction with the alternate engagement and disengagement of the clutches the pinion will impart successive angular increments or decrements to the shaft, according to the way the clutches are manipulated.

11. In a rotary flying shear comprising a pair of parallel rotary drums mounted in rigid bearings and geared together, each of said drums carrying a plurality of shear knives, the knives on one drum co-acting respectively with the knives on the other drum and at least half of all the knives being radially adjustable to cut or not to cut, a magnet for adjusting each adjustable knife, an individual electric circuit for each of said magnets, the same being normally open, controlling means for the said circuits driven from one of the drums to control the cutting sequence of the various knives, a flag operated by the front end of the advancing strip to energize a starting circuit to the knife control magnet of the next succeeding knife, whereby that knife will start a cutting cycle with a short crop end from the front end of the moving strip, and the said cycle controlled by the said knife magnet controlling means will operate until the strip is cut up into sections of predetermined length plus an indefinite remainder.

12. In a rotary flying shear comprising a pair of parallel rotating drums, mounted in rigid bearings, geared together, and each carrying a plurality of electrically controlled coacting knives, means for controlling all the knives to cut in a desired sequence one after another, means for starting the said cutting sequence with any pair of knives, means for restricting the cutting action to half of the pairs of knives, and means for making successive cuts with a single pair of knives only.

13. In a rotary flying shear comprising a pair of parallel rotating drums, mounted in rigid bearings, geared together, and each carrying a plurality of electrically controlled coacting knives, means for controlling all the knives to cut in a desired sequence one after another, means for starting the said cutting sequence with any pair of knives, means for restricting the cutting action to half of the pairs of knives, and means for making successive cuts with a single pair of knives only, in combination with means for angularly advancing or retarding the knife drums in successive increments or decrements between cuts.

14. In a rotary flying shear comprising a pair of parallel rotating drums mounted in rigid bearings, geared together and each carrying a plurality of magnet controlled coacting knives, means for angularly advancing the knife drums between cuts including two air valve magnets and two magnetic drive clutches, a contactor cam for each magnet controlled knife, a contactor cam for each drive clutch, all of the said cams being mounted on a common shaft in fixed relation thereto, a gear box connecting said cam shaft to one of the drum shafts, a magnetic clutch to hold the cam shaft at drum speed and with the knife cams aligned with their respective knives, a second magnetic clutch to connect the cam shaft to the drum shaft through the gear box reduction gears, and automatic means to reverse the control of the said cam shaft clutches when the front end of the strip reaches a position adjacent to the drums, to start a cutting cycle.

In testimony whereof we hereunto affix our signatures.

WALTER W. MACFARREN.
RICHARD A. MACFARREN.